United States Patent
Steer et al.

(10) Patent No.: US 7,304,939 B2
(45) Date of Patent: Dec. 4, 2007

(54) COMMUNICATION USING SIMULTANEOUS ORTHOGONAL SIGNALS

(75) Inventors: David G. Steer, Nepean (CA); Koon Hoo Teo, Nepean (CA); William R. Kirkland, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1088 days.

(21) Appl. No.: 09/998,193

(22) Filed: Dec. 3, 2001

(65) Prior Publication Data

US 2003/0103445 A1    Jun. 5, 2003

(51) Int. Cl.
- *H04J 11/00* (2006.01)
- *H04Q 7/00* (2006.01)
- *H04B 7/216* (2006.01)
- *H04B 7/00* (2006.01)

(52) U.S. Cl. ............... 370/208; 370/210; 370/328; 370/335; 370/342; 455/45

(58) Field of Classification Search ......... 370/203–210
See application file for complete search history.

(56) References Cited

U.S. PATENT DOCUMENTS

| | | | | |
|---|---|---|---|---|
| 5,282,222 | A |  1/1994 | Fattouche et al. | 375/1 |
| 5,444,864 | A |  8/1995 | Smith | 455/84 |
| 6,192,026 | B1 * |  2/2001 | Pollack et al. | 370/203 |
| 6,459,687 | B1 * | 10/2002 | Bourlas et al. | 370/328 |
| 6,473,418 | B1 * | 10/2002 | Laroia et al. | 370/344 |
| 6,731,594 | B1 * |  5/2004 | Bohnke | 370/208 |
| 6,937,557 | B1 * |  8/2005 | Sudo | 370/203 |
| 6,959,050 | B2 * | 10/2005 | Baum et al. | 375/326 |

FOREIGN PATENT DOCUMENTS

| | | |
|---|---|---|
| EP | 1005190 A2 | 5/2000 |
| WO | WO 97/06619 | 2/1997 |

OTHER PUBLICATIONS

Paulraj, Arogyaswami, J. et al., "Space-Time Processing for Wireless Communications", IEEE Signal Processing Magazine, Nov. 1997, pp. 49-83.

Thompson, John, S., et al., "Smart Antenna Arrays for CDMA Systems", IEEE Personal Communications, Oct. 1996, pp. 16-25.

* cited by examiner

*Primary Examiner*—Melanie Jagannathan

(57) ABSTRACT

Wireless communication is improved by simultaneously transmitting signals that are orthogonal to received signals. This technique is referred to as Orthogonal Division Duplexing or ODD. Channel characteristics may be estimated based on an analysis of the received signals. Subsequently, techniques used in the transmitting of signals may be adjusted based on the estimated channel characteristics. By using interleaved pilot sub-carriers, each end of a communications link may take measurements of channel conditions. These measurements may be used to adapt the transmission techniques used in the transmitter to the measured channel conditions. Advantageously, this adaptation can occur without the delay in reporting conditions that is characteristic of traditional adaptive communications systems.

33 Claims, 7 Drawing Sheets

COMMUNICATION USING SIMULTANEOUS ORTHOGONAL SIGNALS

FIELD OF THE INVENTION

The present invention relates to communication and, more particularly, to communication using simultaneous orthogonal signals.

BACKGROUND

Typically, in radio communications systems, an attempt is made to use radio transmission techniques (including modulation, coding and antenna processing) that are suited to the channel conditions. By doing so, the radio channel is used efficiently.

To this end, radio transmission techniques are traditionally first chosen and then designed into wireless communication equipment based on an expected performance of a channel that the equipment will be using to communicate. The radio transmission techniques may also be chosen based on a need to deliver a guaranteed level of service, which may be, for example, defined by a data rate, an error rate or a combination thereof. As channel conditions are typically described by statistical functions that vary over time, the channel may change considerably during the use of the equipment. The traditional approach to choosing radio transmission techniques usually results in a conservative design that is reliable, but does not use the full potential channel capacity. Often the radio channel performs better than the worst-case conditions. Where wireless communication equipment is designed with the worst-case channel conditions in mind, the radio transmission technique chosen is often too conservative. That is, not as much data is sent through the channel as could be sent using modulation and/or coding techniques different from the chosen techniques. However, to maintain a guaranteed performance in the worst-case channel conditions, such conservative choices may be necessary.

In modern radio systems, the radio transmission techniques may be dynamically adapted to suit the channel conditions at the time of transmission. The equipment may be designed with a capability to adapt the radio transmission techniques quickly to respond to changes in the channel conditions. The response may include changes in the modulation techniques, coding techniques or antenna configurations for, say, beam tracking. Typically this adaptation involves a feedback control loop in which the channel conditions are measured at a remote receiver.

Channel conditions may, for instance, include a carrier to interference ratio or a data error rate. Measurements of these channel conditions may be signaled from the remote receiver to a transmitter so that the transmitter may adjust radio transmission parameters, such as power level, coding technique, modulation technique and antenna processing, to suit the signaled channel conditions. As the channel conditions vary over time, the radio transmission techniques may be adapted to suit the conditions reflected in the most recently received measurements. Thus, improved system performance may be achieved. System performance may be, for example, measured in terms of an amount of data throughput or a degree of interference with adjacent systems.

This adaptive communication technique is particularly suited to wireless Internet applications where the transmission of data may be delayed in time to await more favorable channel conditions. Advantageously, a constant user bit rate, which is a requirement of traditional radio systems, may not be a requirement of wireless Internet applications. It may also be important to improve the efficiency of frequency reuse (the simultaneous use of a frequency for two or more purposes) through, for example, antenna beam tracking.

One difficulty with this adaptive technique, however, is the requirement to estimate the current channel conditions. The adaptive technique provides the best performance when the channel conditions can be accurately determined. However, the channel conditions can change rapidly with time, particularly in a mobile communications environment, and the channel conditions may change significantly within a few milliseconds of being measured. The measurements may, thus, be of little benefit to the adaptive technique after the delay needed for the measurements to be signaled from the receiver to the transmitter. In a typical indoor office environment, measurements have shown that a channel may be completely decorrelated after about ten milliseconds (at a 900 MHz transmission frequency). Thus, the feedback control loop for the adaptive technique must be able to take measurements and provide the measurements to the transmitter within a few milliseconds for the information to be useful. Other studies have shown that a significant portion of the advantage of adaptive modulation and coding is lost if the channel information is old.

A traditional approach to (two way) radio system design places the two directions of transmission in different frequency channels. This separation of the transmission and reception frequency, known as Frequency Division Duplexing (FDD), is necessary to permit the radio apparatus to adequately separate the relatively strong local transmissions from the relatively (very) weak signals received from the other end. Unfortunately, because the receiver is receiving on a channel that is well separated, in frequency, from the channel used by a related transmitter, the channel conditions measured by the receiver may not be suitable for adapting the radio transmission techniques for the transmitter.

SUMMARY

By using orthogonal signals for each direction of communication on a communications channel, each end of a communications link using the channel may transmit and receive simultaneously in the same frequency band. Additionally, a receiver may take measurements of channel conditions. These measurements may be used to adapt the transmission techniques used in the transmitter to suit the measured channel conditions. Advantageously, this adaptation can occur without the delay necessary for reporting of conditions that is characteristic of traditional adaptive communications systems.

This technique enables measurements of channel conditions to be made simultaneously with the communications. Thus, this technique may provide a communications endpoint an ability to generate measurements of the communications channel conditions that are more accurate and timely than those used in known duplexing techniques. These measurements enable improved performance to be achieved by communications systems that make use of channel information to adapt transmission techniques. Such transmission techniques include modulation, coding, beam tracking, space-time coding and other antenna processing techniques. This technique also allows for asymmetric uplink and downlink data flows.

In accordance with an aspect of the present invention there is provided a method of communicating over a communications channel. The method includes receiving a received signal that includes a remotely transmitted signal, where the remotely transmitted signal is in a given frequency band and transmitting, concurrent with the receiving, a locally transmitted signal in the given frequency band, where the locally transmitted signal is substantially orthogonal to the remotely transmitted signal.

In accordance with another aspect of the present invention there is provided an apparatus for communicating over a communications channel. The apparatus includes a receiver for receiving a received signal that includes a remotely transmitted signal, where the remotely transmitted signal is in a given frequency band and a transmitter for transmitting, concurrent with the receiving, a locally transmitted signal in the given frequency band, where the locally transmitted signal is substantially orthogonal to the remotely transmitted signal.

In accordance with a further aspect of the present invention there is provided a radio communication system. The radio communication system includes a base station and a mobile terminal. The base station includes a base station receiver for receiving a base station received signal that includes a mobile terminal transmitted signal, where the mobile terminal transmitted signal is in a given frequency band and a base station transmitter for transmitting, concurrent with the receiving, a base station transmitted signal in the given frequency band, where the base station transmitted signal is substantially orthogonal to the mobile terminal transmitted signal. The mobile terminal includes a mobile terminal receiver for receiving a mobile terminal received signal that includes the base station transmitted signal and a mobile terminal transmitter for transmitting, concurrent with the receiving, the mobile terminal transmitted signal.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
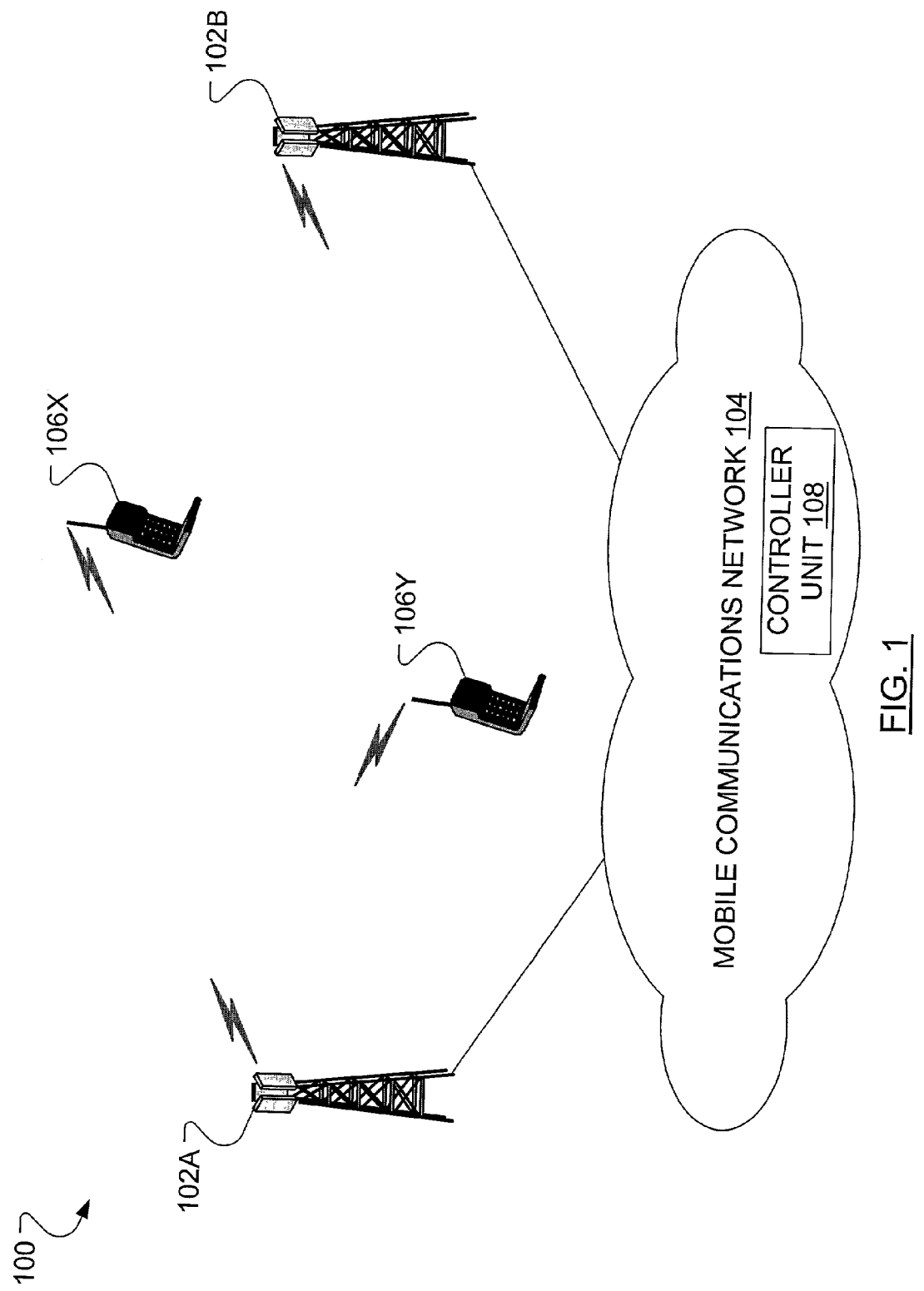
FIG. 1 illustrates a radio communications system including base stations and mobile terminals for use with an embodiment of the present invention.

A radio communications system 100 is illustrated in FIG. 1. A pair of base stations, namely a first base station 102A and a second base station 102B (referred to hereinafter individually or collectively as 102), are connected to a mobile communications network 104. The base stations 102 are arranged with coverage for use of mobile terminals 106, examples of which are shown as a first mobile terminal 106X and a second mobile terminal 106Y. The mobile terminals 106 communicate with the base stations 102, and hence the mobile communications network 104, via two-way radio transmissions. These two-way transmissions, for example, can support a bi-directional flow of data between the mobile terminal 106 and a server (not shown) in the mobile communications network 104, or a two-way speech conversation. A controller unit 108 is included in the mobile communications network 104 for supervising the base stations 102.

Figure 4:
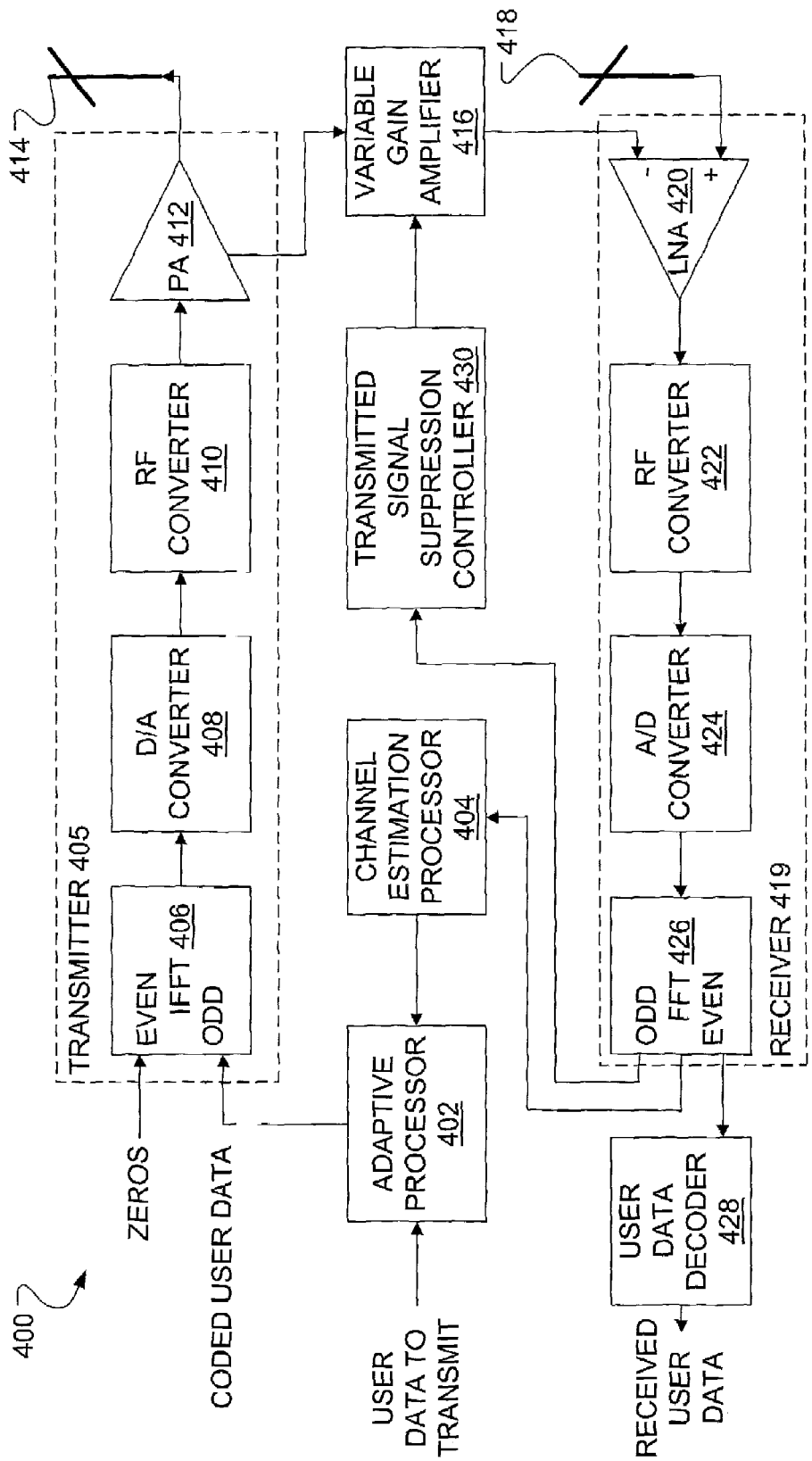
FIG. 4 schematically illustrates a transceiver apparatus for a base station of FIG. 1 according to an embodiment of the present invention.

Components of a base station transceiver apparatus 400 that is part of the base station 102 are illustrated in FIG. 4, according to one embodiment of the present invention. User data that is to be transmitted is first received at an adaptive processor 402. The adaptive processor 402 also receives input from a channel estimation processor 404. Output from the adaptive processor 402 may be passed to a base station transmitter 405 where the output is applied to an Inverse Fast Fourier Transform (IFFT) 406 along with further input to identify the desired zeroes of a digital output signal. The digital output signal from the IFFT 406 is received by a digital to analog converter (DAC) 408 where the signal is converted to an analog signal. This analog signal is used to modulate a radio frequency at a transmit radio frequency (RF) converter 410. The modulated radio frequency signal is then passed to a power amplifier 412 for amplification before being transmitted through the use of a transmit antenna 414. The transmitted signals are also monitored by a variable gain amplifier 416.

Signals are received at the base station transceiver apparatus 400 at a receive antenna 418. At the input to a base station receiver 419, a low noise amplifier (LNA) 420 compares these received signals with an error signal from the variable gain amplifier 416. This comparison is achieved through the arrangement of the LNA 420 as a differential amplifier and allows signals from the mobile terminal 106 to be distinguished from those signals being transmitted at the transmit antenna 414. The output of the LNA 420 is received at a receive RF converter 422 to remove the RF component of the signal. The analog signal at the output of the receive RF converter 422 is converted to a digital signal by the an analog to digital converter (ADC) 424. The digital version of the received signal is then passed to a Fast Fourier Transform (FFT) 426 to extract the information available in the Fourier transform of the signal. This information is shared among the channel estimation processor 404, a transmitted signal suppression controller 430 and a user data decoder 428. It is the transmitted signal suppression controller 430 that controls the gain on the variable gain amplifier 416 so as to appropriately remove the transmitted signals from the received signals. The output of the user data decoder 428 is a decoded version of the information sent from the mobile terminal 106.

Figure 5:
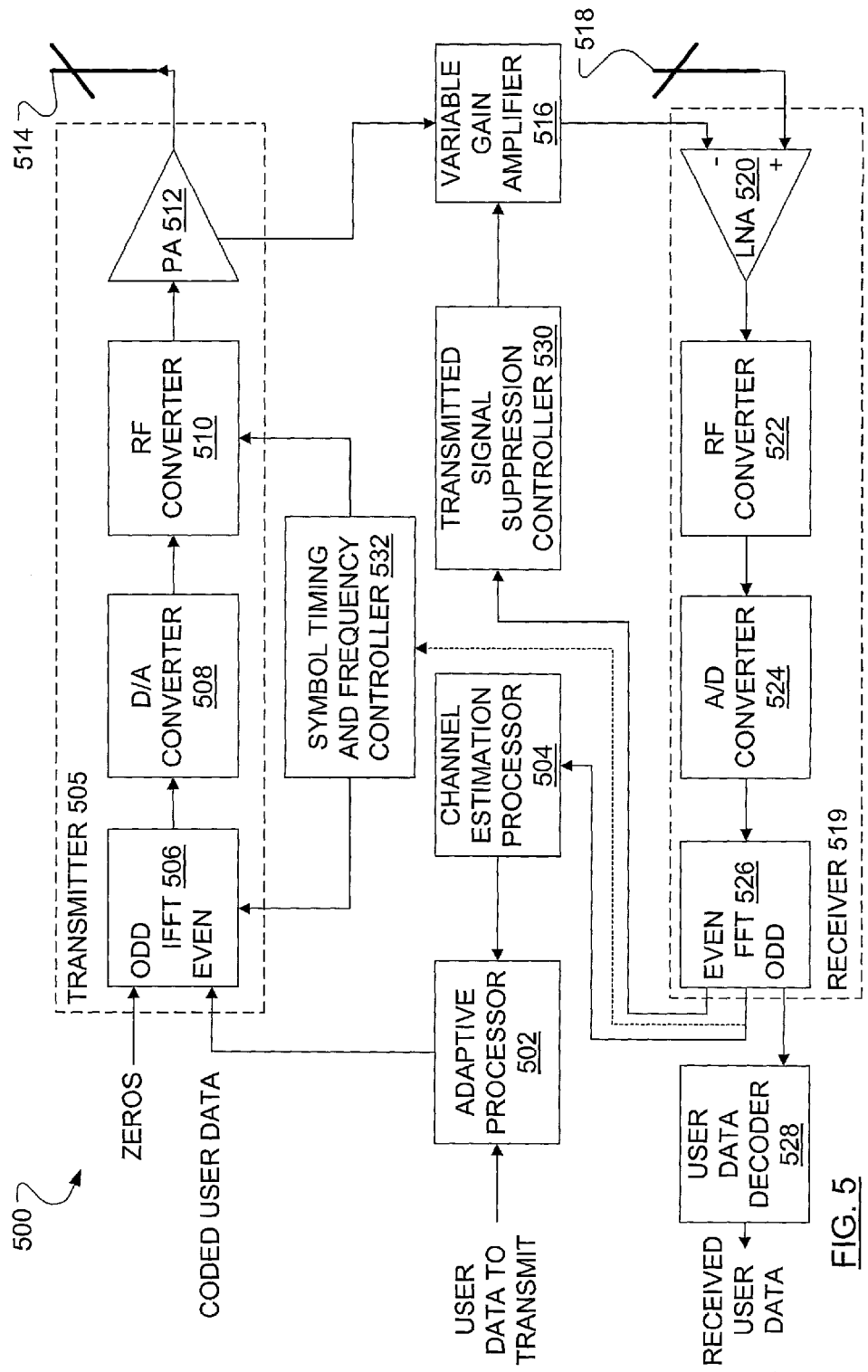
FIG. 5 schematically illustrates a transceiver apparatus for a mobile terminal of FIG. 1 according to an embodiment of the present invention.

Components of a mobile transceiver apparatus 500 that is part of the mobile terminal 106 are illustrated in FIG. 5, according to one embodiment of the present invention. User data that is to be transmitted is first received at an adaptive processor 502. The adaptive processor 502 also receives input from a channel estimation processor 504. Output from the adaptive processor 502 may be passed to a mobile transmitter 505 where the output is applied to an Inverse Fast Fourier Transform (IFFT) 506 along with further input to identify the desired zeroes of a digital output signal. The digital output signal from the IFFT 506 is received by a digital to analog converter (DAC) 508 where the signal is converted to an analog signal. This analog signal is used to modulate a radio frequency at a transmit radio frequency (RF) converter 510. The modulated radio frequency signal is then passed to a power amplifier 512 for amplification before being transmitted through the use of a transmit antenna 514. The transmitted signals are also monitored by a variable gain amplifier 516.

Signals are received at a receive antenna 518. At the input to a mobile receiver 519, a low noise amplifier (LNA) 520 compares these received signals with an error signal supplied by the variable gain amplifier 516. This comparison is achieved through the arrangement of the LNA 420 as a differential amplifier and allows signals from the base station 102 to be distinguished from those signals being transmitted at the transmit antenna 514. The output of the LNA 520 is received at a receive RF converter 522 to remove the RF component of the signal. The analog signal at the output of the receive RF converter 522 is converted to a digital signal by the analog to digital converter (ADC) 524. The digital version of the received signal is then passed to a Fast Fourier Transform (FFT) 526 to extract the information available in the Fourier transform of the signal. This information is shared among the channel estimation processor 504, a transmitted signal suppression controller 530, a symbol timing and frequency controller 532 and a user data decoder 528. It is the transmitted signal suppression controller 530 that controls the gain on the variable gain amplifier 516 so as to appropriately remove the transmitted signals from the received signals at the LNA 520. The output of the user data decoder 528 is a decoded version of the information sent from the base station 102. The symbol timing and frequency controller 532 communicates with the IFFT 506 and the transmit RF converter 510 for controlling symbol timing and sub-carrier center frequency values.

In overview, providing continuous reception and transmission within the same channel may be achieved by arranging the signals being transmitted to be orthogonal to those being received. Thus, each end of a radio communications link may simultaneously receive signals from the other end and transmit signals to the other end. Furthermore, this simultaneous reception and transmission may be performed while estimating the channel conditions. The delay between determining an estimate of the channel conditions and the use of that estimate is the time needed for measurement of the channel conditions at the base station receiver 419 (which is collocated with the base station transmitter 405) and the calculation of an appropriate adaptation of radio transmission techniques. Thus, an optimum advantage can be taken of adaptive communication, as the channel estimation information is more current than is available with other duplexing techniques.

The channel estimation process and the process of adaptation of radio transmission techniques operate together to measure and estimate the channel conditions and to adapt the radio transmission techniques to suit the latest conditions of the channel. In a preferred technique, data is modulated onto a set of sub-carriers at predictable frequencies. To enable the channel to be estimated, pilot signals may be introduced by the base station transmitter 405. Typically, a sub-set of the sub-carriers, known as pilot sub-carriers, are selected and modulated in a pattern known to the mobile receiver 519. Signals on pilot sub-carriers received the mobile receiver 519 are compared with expected signals in the channel estimation processor 504 at the mobile terminal 106. For example, if a particular measurement of a received pilot signal is lower in strength than the last measurement of the same pilot signal, the channel estimation processor 504 can conclude that the channel has deteriorated and indicate to the adaptive processor 502 that a stronger coding and/or lower level of modulation may be necessary for the next transmissions. Similarly, if the particular received pilot signal has strengthened since it was last measured, then a less robust coding and/or higher level of modulation may be selected by the adaptive processor 502.

As the full transmission signal occupies a significant bandwidth, such as 5 MHz, the channel effects on the sub-carriers will be different in different parts of the channel. For example, the channel may be logically divided into 30 sub-carriers, numbered 1-30. In operation, sub-carriers 2 and 4 may be affected by the channel differently than channels 20 and 30. On the other hand, sub-carriers 1, 3 and 5 may be expected to be affected by the channel in a similar way to 2 and 4. By introducing a sufficient number of pilot signals on sub-carriers suitably distributed across the channel, the effects of the channel may be determined for nearby sub-carriers. For example, with pilot signals available in sub-carriers 20 and 30, the effect on the sub-carriers in-between (21-29) may be estimated by a linear interpolation from the measurements of the pilots at 20 and 30. For the mobile radio channel, it has been found that using about 10% of the sub-carriers for pilot signals provides sufficient resolution to estimate the channel without an undue loss of capacity (as the pilot sub-carriers are not available to carry user payload data). A suitable number and distribution of pilot sub-carriers is shown in the Digital Video Broadcasting (DVB) Standard found in European Telecommunications Standards Institute (ETSI) standard EN 300-744 (hereby incorporated herein by reference). Chapter five of Richard van Nee and Ramjee Prasad, "OFDM for Wireless Multimedia Communications", Artech House publishers 2000, ISBN 0-89006-530-6 also discusses the principles of channel estimation for Orthogonal Frequency Division Multiplexing (OFDM) radio systems.

In the DVB standard, there are both "fixed" and "wandering" pilot signals. The fixed pilot signals remain with the same sub-carrier for all transmitted symbols. The wandering pilot signals change their sub-carrier location, in a sequence known to the receiver, from symbol to symbol. Consequently, the channel estimation may not only involve interpolation between sub-carriers in frequency but also interpolation between sub-carriers in time. This two-dimensional interpolation permits a better estimate of the channel for each sub-carrier.

Orthogonality of the transmitted and received signals can be achieved in a number of ways. These ways include traditional Time Division Duplexing (TDD), Code-Division Duplexing and Orthogonal Division Duplexing (described hereinafter). The important property of the orthogonality, in this context, is that the integral of the received signal together with a suitable function over an interval of time is zero for all except the desired signal.

Orthogonality may be defined more formally as follows:

A set of functions $u_1, u_2, u_3 \ldots u_n$ are said to be orthogonal functions if the integral over some interval of the product of $u_n$ and the conjugate of $u_m$ is zero when n and m are not equal. The conjugate operation is needed for complex valued functions. The function $u_m$ and the conjugate of $u_m$ are equivalent for real functions. Further details of orthogonal functions and their relation to Fourier analysis may be found in chapter 2 of Harry Davis, "Fourier Series and Orthogonal Functions", Allyn and Bacon Inc., Publishers, Library of Congress catalogue 63-13527.

Traditional TDD provides orthogonal signals by requiring that transmission and reception occur in designated different time intervals. In contrast, the following two methods for providing orthogonal signals allow for simultaneous transmission and reception. Accordingly, the transmission techniques may be dynamically adjusted based on estimates of the characteristics of the channel that are much more accurate and timely. That is, estimates of the characteristics of the channel obtained from analysis of the received signal may be used immediately to adjust transmission techniques, rather than waiting for the next transmission interval. In the case of TDD, the functions that assure orthogonality are those that are only non-zero during different intervals of time for each direction of transmission. This defines the uplink and downlink transmission burst time slots.

One way to make orthogonal signals is to use orthogonal spreading codes at the transmitter and the receiver. Although this is done in CDMA mobile radio systems, the channel for transmitting is separate from the channel for receiving. For a more complete description of CDMA, see, for example, Gordon L. Stüber, "Principles of Mobile Communication" (hereby incorporated herein by reference) beginning on page 6 and later sections. So-called Walsh functions, used in the Telecommunications Industry Association standard IS-95, for example, may be used to generate orthogonal CDMA codes. Code-division duplexed signals, transmit (Tx) and receive (Rx), may then be separated through the use of a correlator at the receiver. With the herein proposed arrangement, the two signals overlap in the radio spectrum and the correlator must have sufficient gain (i.e., the orthogonal codes must have sufficient spreading gain) to allow the weak received signal to be separated from the strong, locally generated, transmitted signal. While such codes are practical, the chip timing at each of the two ends must be synchronized in time for optimum orthogonality. A drawback of the orthogonal code-division duplexing technique is a difficulty in determining a true signal to noise ratio in the received signal, as both the transmitted signal and the received signal occupy the same spectrum and the transmitted signal is the major source of interference. The functions that assure orthogonality in the case of Code Division Duplexing are typically complex valued time sequences that integrate to zero over the symbol time interval (as in the above integral definition). The Walsh functions used in CDMA systems are common examples of orthogonal CDMA sequences.

A preferred method to obtain orthogonal signals is to generate the transmitted signal in such a way that data is modulated onto "sub-carriers" at predictable frequencies across the assigned radio communications channel. At other predictable frequencies are "zeros" where there is no signal present. At each end of the radio link, the transmitted signal has zeros at the frequencies of the transmitted sub-carriers of the other end, and sub-carriers at frequencies of the zeros of the other end. The two sets of sub-carriers thus interleave and do not interfere with each other. We call this communication technique Orthogonal Division Duplexing, or "ODD".

As the sub-carriers are spread throughout the channel in ODD, the receiver is able to determine channel conditions for the sub-carriers that are received. The channel conditions for the transmission sub-carriers may then be estimated by interpolating between channel conditions of the received sub-carriers.

These transmissions may be made in a manner similar to that used for Orthogonal Frequency Division Multiplexing (OFDM). Traditional OFDM radio systems use frequency division duplexing with a transmit channel and a receive channel. Transmissions from a base station may be sent to multiple mobile terminals on predetermined sub-carriers of the transmit channel. Transmissions from the mobile terminals are received on predetermined sub-carriers in the receive channel. For OFDM, the sub-carrier frequency spacing and the symbol timing are carefully chosen such that the zeros of the transmitted spectrum of each sub-carrier fall on the center of the other sub-carriers. Thus, there is no interference between sub-carriers and each set of transmitted sub-carriers is said to be orthogonal to the other transmitted sub-carriers. An OFDM transmission is typically generated using an Inverse Fast Fourier Transform (IFFT) technique. Richard Van Nee and Ramjee Prasad, "OFDM for Wireless Multimedia Communications" (hereby incorporated herein by reference) describes a suitable method for setting the symbol timing, the sub-carrier spacing and the number of sub-carriers in each set.

For ODD, the sub-carrier frequency spacing and the symbol time are carefully chosen such that the zeros of the transmitted spectrum signal fall on the centers of the sub-carriers of the received spectrum. Thus there is no interference between sub-carriers and the signal is said to be orthogonal. To ensure the orthogonality of the sub-carriers, the frequency spacing of the sub-carriers may be selected to be equal to the reciprocal of the symbol duration.

In the case of ODD, the functions that assure orthogonality are created by the Fourier transform and the timing of the symbols. This defines a set of sub-carriers and using every second sub-carrier enables the two directions of transmission to be interleaved to form the uplink and downlink.

Figure 2:
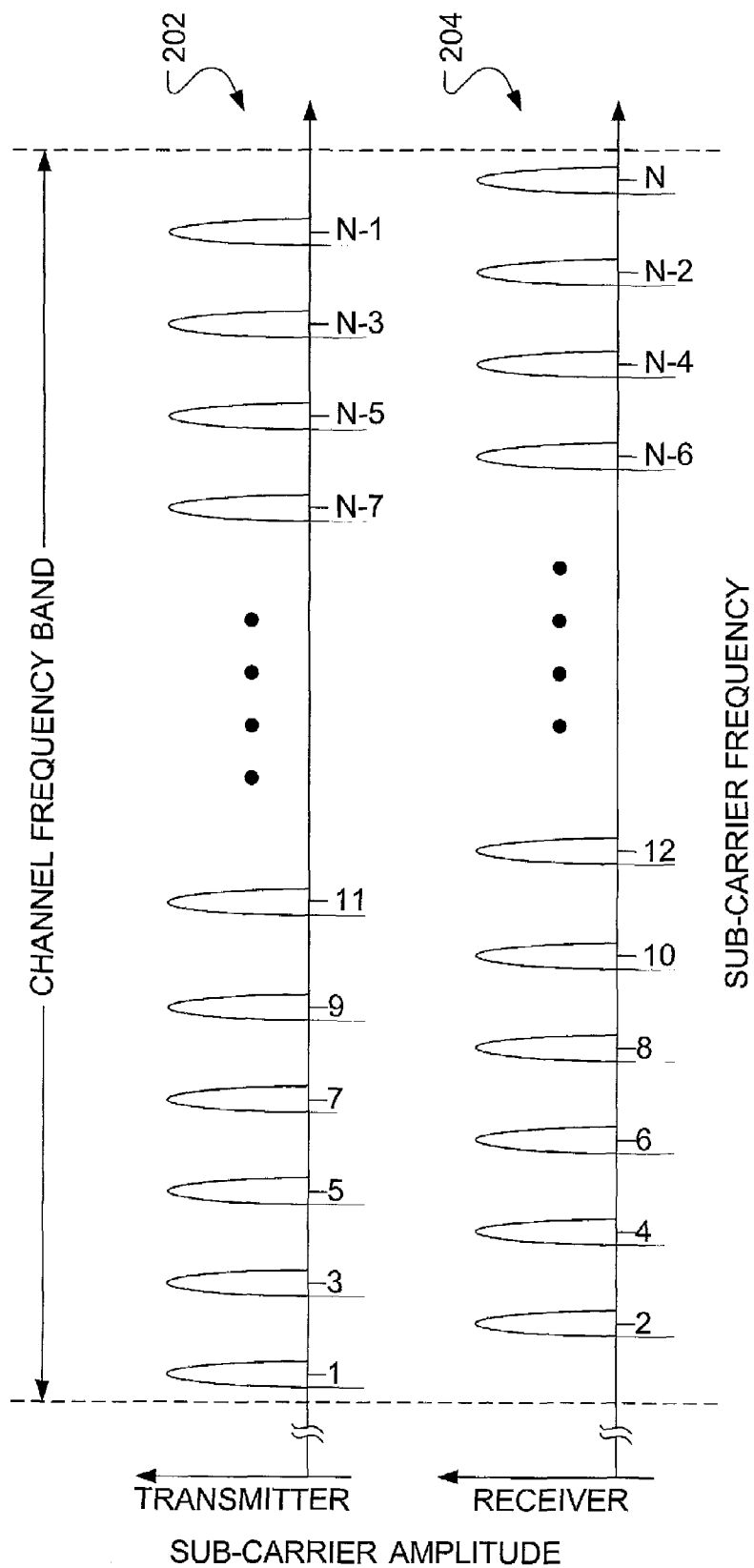
FIG. 2 illustrates an arrangement of transmitter and receiver sub-carrier spectra according to an embodiment of the present invention.

A transmitted signal appropriate for ODD (i.e., a transmitted signal with a comb structure of zeros and active sub-carriers that facilitates interleaving of the transmitted signal with a received signal) can be formed, for example, by arranging that a zero value be supplied at all the even inputs to the base station IFFT 406. At the mobile terminal 106, an appropriate transmitted signal may be formed by entering zero for all the odd inputs to the mobile terminal IFFT 506. This will cause every second sub-carrier to be zero and allow space for the interleaving of the two directions of transmission. Exemplary ODD transmit signals, generated by a base station 102 using the IFFT 506, and receive signals are illustrated in FIG. 2. As illustrated in a transmitter spectrum 202, the base station transmitter 405 (FIG. 4) transmits on the odd sub-carriers and, as illustrated in a receiver spectrum 204, the mobile transmitter 505 (FIG. 5) transmits such that the base station receiver 419 receives on the even sub-carriers.

Of course, while even/odd is one way to organize the sub-carriers, other patterns are possible (every third, random, etc.), subject to a constraint that the channel is suitably sampled across its width. Suitably sampled means that there are enough samples (i.e., received sub-carriers) of the channel across the frequency band to allow a good estimate of the channel to be made. This is an application of the Nyquist sampling theorem. Note that this technique also allows a different number of sub-carriers to be used in each direction, for instance, say one third of the sub-carriers dedicated to signals from the mobile terminal 106 to the base station 102

(uplink) and two thirds of the sub-carriers dedicated to signals from the base station 102 to the mobile terminal 106 (downlink), to match asymmetric traffic flows. This is often the case in the Internet service to a mobile end user.

Notably, this latter technique requires determining an amount of downlink traffic in the locally transmitted signal, determining an amount of uplink traffic in the remotely transmitted signal and determining a traffic ratio that is a ratio of the amount of downlink traffic to the amount of uplink traffic. The ratio of the number of sub-carriers dedicated to the downlink to the number of sub-carriers dedicated to the uplink may be arranged to be proportional to said traffic ratio.

In an alternative sub-carrier assignment technique, the center frequencies of the sub-carriers for the uplink and downlink may be selected from two pseudo-random but non-overlapping sets of candidate sub-carrier center frequencies. The sets may then be changed, perhaps as often as once every symbol duration (i.e., for successive transmitted symbols), in a pseudo-random pattern known to the both the receiver and the transmitter. This technique may be called "frequency hopping" and may serve to reduce interference between adjacent cells.

Figure 3:
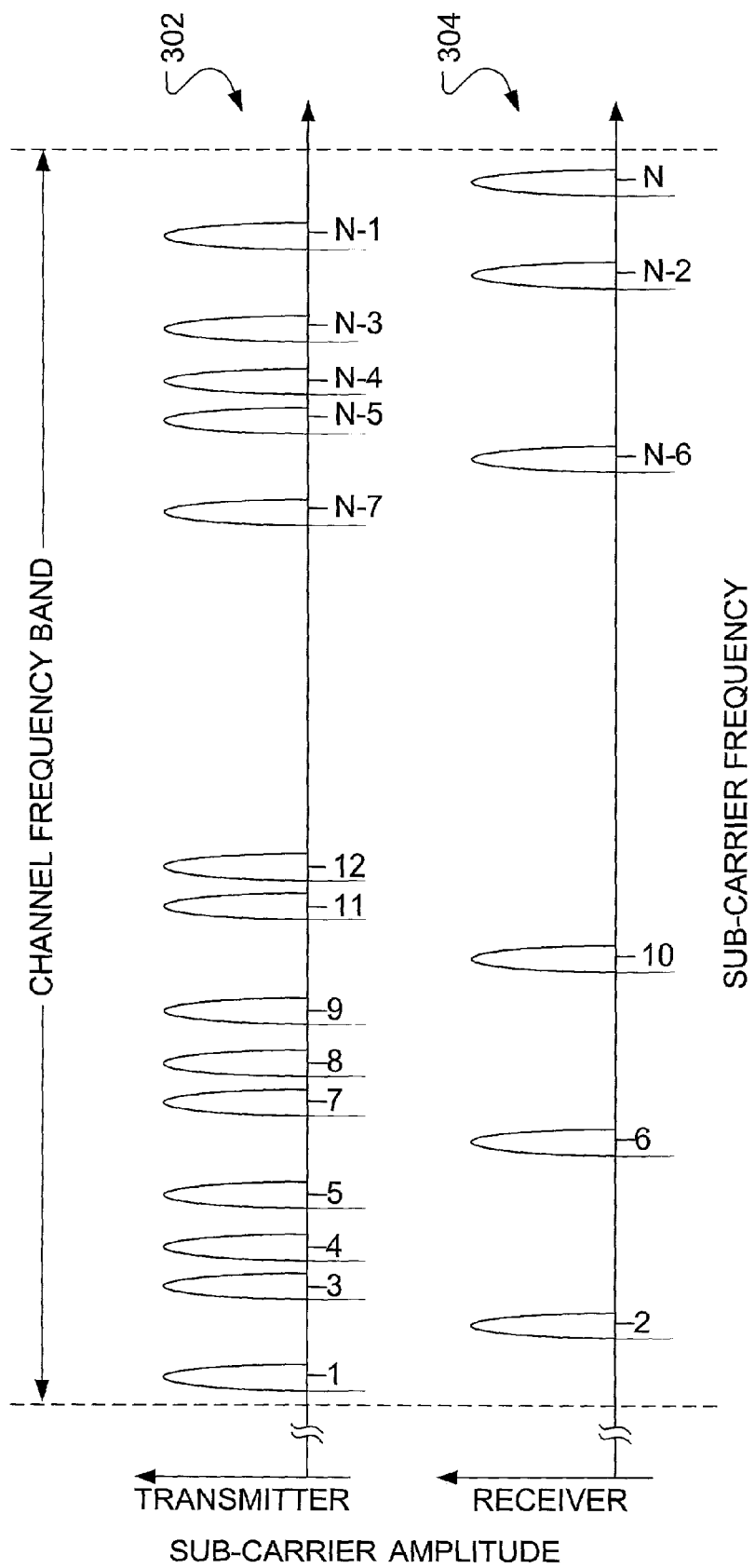
FIG. 3 illustrates, in an alternative arrangement to that of FIG. 2, transmitter and receiver sub-carrier spectra according to an embodiment of the present invention.

FIG. 3 illustrates a sub-carrier arrangement in which more sub-carriers are assigned to a downlink spectrum 302 than an uplink spectrum 304 to allow the transmission of more data traffic in the downlink direction. This may be achieved by setting the appropriate inputs to the IFFT 406, 506 in the transmitters 405, 505 (FIGS. 4, 5) to zero to create the appropriate interleaving of the sub-carriers.

While the pattern of sub-carriers assigned for uplink and downlink may be 104 fixed within the radio system 100, the pattern of sub-carriers may also be changed dynamically to support, for example, changes in the traffic flow in the uplink and downlink directions. In such a dynamic arrangement, the controller unit 108 in the radio system 100 (FIG. 1) may measure the traffic flow in each direction and act to increase or decrease the number of sub-carriers allocated to each direction, so that the allocation better accommodates the traffic requirements. The changes in the sub-carrier allocations would be signaled between the base station 102 and the mobile terminals 106 using signaling facilities inherent in the radio communications system. This signaling would occur before the changes in the sub-carrier allocations so that the two ends remain in synchronization. The allocation of sub-carriers may also be changed regularly, in a predetermined pseudo-random pattern to reduce the interference effects of the transmissions into adjacent cells in a multi-cell communications system. This is similar to "frequency hopping" used in some systems, for instance, the Global System for Mobile communication (GSM).

The changes in the allotment of sub-carriers to the uplink and the downlink would be effected relatively slowly in response to changes in the average traffic flows sensed by the controller unit 108, of which there may be more than one in a given mobile communication network. Any changes in the sub-carrier allotment should be done fairly slowly, say, over period of minutes, as it may take time to ascertain average traffic flows and each of the mobile terminals 106 must be informed of the new allotments ahead of time so the base stations 102 and the mobile terminals 106 can all switch together to the new arrangement.

In the radio communications system 100 of FIG. 1, there may be multiple base stations 102 and a multitude of mobile terminals 106. While, generally, on the downlink (the link from the base station 102 to the mobile terminals 106) all of the mobile terminals 106 will receive the same broadcast signals from the base station 102, on the uplink (the link from the mobile terminals 106 to the base station 102), more than one mobile terminal 106 may need to transmit at one time. With ODD, the uplink sub-carriers may be sub-divided among multiple mobile terminals 106, with each mobile terminal 106 transmitting on a sub-group of the total available uplink sub-carriers. With this arrangement, for example, a single high-speed downlink service may be combined with many lower speed uplink services from the mobile terminals 106. This provides a way to multiplex the traffic from many users together. In this case, the base station receiver 419 will be receiving signals from many mobile terminals 106 and may measure the channel conditions for each. The transmission adaptation process for the downlink will then, typically, be based on the worst of the measured channel conditions. This will guarantee service, but at the expense of reduced throughput as the system will be hampered by the conditions in the weakest uplink. Alternatively, the adaptation may ignore the weakest uplinks to concentrate on those uplinks that provide acceptable performance while performing retransmissions of data later on the weakest uplinks when their channel conditions have improved.

At the base station receiver 419, the task of separating the received signal from the locally transmitted signals is made easier by their orthogonality. By virtue of the IFFT 406 used to generate a transmitted signal, there are no transmitted signals at the intended receive sub-carrier frequencies. The issue for reception is thus not one of filtering, but more simply, of dynamic range in the base station receiver 419. The dynamic range of a particular receiver is a ratio of the strongest to the weakest signal that can be processed by the particular receiver.

The dynamic range may be addressed with several techniques. By employing separate Tx and Rx antennas, with suitably low coupling (perhaps with orthogonal polarization), the magnitude of the Tx sub-carriers can be considerably reduced in the base station receiver 419. However, separate antennas are only suitable for low radio frequency operation. If the antennas are separated by more than about one quarter wavelength or are of opposite polarization, then, particularly in a multi-path propagation environment, the radio channel conditions experienced by the two antennas may be uncorrelated. This will reduce the suitability of the measured channel characteristics for use to adapt the transmissions. As illustrated hereinafter, a preferred implementation is a single transmit/receive antenna. A single antenna arrangement is also more practical for the small, portable handsets typical of the mobile terminals 106.

To further reduce the amount of signal in the receiver front end, the LNA 420 (FIG. 4) may be arranged differentially, to subtract away much of the transmitted signal. In this arrangement, an error signal, which is an attenuated, inverted and slightly delayed version of the transmitted signal, is fed into the LNA 420 together with the signal from the receive antenna 418. This serves to cancel out most of the transmitted sub-carriers, thereby reducing the range of amplitudes between the locally transmitted signals and the desired sub-carriers sent by the mobile transmitter 505. Suitable high linearity and high dynamic range amplifiers and analogue-to-digital converters can then be constructed to sample the received signal. The FFT 426 may then be able to separate the orthogonal sub-carriers that are to be received from the orthogonal sub-carriers transmitted, and thus enable detection of the incoming data.

FIG. 4 illustrates the base station transceiver apparatus 400 for using the ODD technique. FIG. 4 shows a configuration with the transmit antenna 414 separated from the receive antenna 418 for clarity of explanation. On the transmission side, data to be transmitted to the mobile receiver 519 is received at the adaptive processor 402. This data is coded and modulated using techniques chosen according to the latest information about the channel received from the channel estimation processor 404. The coded bits may then be sent as the odd inputs to the IFFT 406 where the coded bits modulate the odd sub-carriers. The IFFT processes the samples of data to be transmitted (plus the pilot signals) that are organized in frequency space (i.e., represented by sub-carriers) and transforms these into a time sequence of samples that represent the composite base-band signal to be transmitted for the symbol interval. The even inputs may be set to zero to provide zero transmitted signal at the intermediate sub-carriers. The output time sequence from the IFFT 406 is then converted to analog format by the DAC 408, converted to the appropriate radio frequency for the assigned channel by the transmit RF converter 410, amplified to a suitable level by the power amplifier 412 and sent to the transmit antenna 414 for transmission over-the-air to the mobile terminal 106. In many cases, the RF conversion process performed by the transmit RF converter 410 and the power amplifier 412 also involves some filtering to confine the signals to the assigned channel.

As discussed above, an error signal that is a version of the transmitted signal may be coupled through the variable gain amplifier 416, which may also be called an attenuator, to the differential input of the LNA 420. A signal representative of the transmitted signal is typically taken from one of the internal stages of the power amplifier 412 to reduce the coupling between the transmit antenna 414 and the error signal. This avoids any other signals that may be incident on the transmit antenna 414 (including the desired signal from the mobile terminal 106) from becoming part of the error signal.

The summation input of the LNA 420 is connected to the receive antenna 418. This receive antenna 418 may be separated from the transmit antenna 414 and may be arranged with a different polarization to reduce coupling from the transmitted signal. The LNA 420 provides, as its output, the difference between its two inputs. Thus, the attenuated version of the transmitted signal provided though the attenuator coupling from the base station transmitter 405 (the error signal) is subtracted from the received signal (which includes a remotely transmitted signal, a locally transmitted signal and noise) from the receive antenna 418 leaving, substantially, the remotely transmitted signal from the mobile terminal 106 at the output of the LNA 420.

The variable gain amplifier 416 provides a complex gain function enabling adjustment to both the amplitude and phase of the error signal coupled to the differential input of the LNA 420. As the received signal may contain several delayed copies of the transmitted signal (due to multi-path reflections in the nearby environment) the variable gain amplifier 416 may also be provided with the capability to develop a composite of multiple attenuated and phase shifted copies of the transmitted signal to feed to the differential input of the LNA 420. Forming the multiple delayed copies of the transmitted signal is analogous to the operation of the equalizers that are sometimes used to process the received signal in other receivers. Although, in this case, the equalizer is working with the locally transmitted signal and is adapted by a transmit control suppression process.

The received signal is then down-converted to baseband by the receive RF converter 422 and sampled by the ADC 424. Digital samples at the output of the ADC 424 are then processed by the FFT 426, the output of which includes signals from each of the sub-carriers.

Information carried on the even sub-carriers becomes the user data (i.e., payload data) after decoding at the user data decoder 428. The pilot sub-carriers are supplied, by the FFT 426, to the channel estimation processor 404 so that an estimate of the channel conditions may be generated. Typically, the output of the channel estimation processor 404 would be a signal to noise (or signal to noise plus interference) ratio estimate for each of the sub-carriers (or at least groups of them). These estimates would then be used by the adaptive processor 402 to select a suitable coding and modulation technique (or an antenna processing configuration, etc.) for each sub-carrier (or group of sub-carriers). In this method, the channel information gained on a received symbol can be used for the next transmitted symbol.

The received sub-carriers (even) are not at the same sub-carrier frequencies as the ones used for transmission (odd). The received sub-carriers may be interleaved with the transmitted sub-carriers, however, and the channel estimation processor 404 may interpolate between the received sub-carriers to accurately estimate the conditions for the transmitted sub-carriers. This may be done, for example, by taking the average of the conditions for the two received sub-carriers on each side of a sub-carrier to be transmitted.

For the present example, the odd sub-carriers at the output of the FFT 426 represent the (undesired) locally transmitted sub-carriers. These should be as small as possible to minimize the effect of the locally transmitted signal on the dynamic range of the LNA 420. The odd outputs from the FFT 426 are coupled to the transmitted signal suppression controller 430. The output of the transmitted signal suppression controller 430 is used to control the variable gain amplifier 416 coupling the error signal into the differential input of the LNA 420. The transmitted signal suppression controller 430 may, for example, compute the average power of the odd received sub-carriers and, based on this average, adjust the gain of the variable gain amplifier 416 to minimize the computed average power. For instance, if the average power of the odd outputs increases, the attenuation through the variable gain amplifier 416 would be decreased in order to increase the amount of cancellation happening at the LNA 420.

Returning to the actions of the adaptive processor 402, a common way to adapt transmission techniques is to use a lookup table in which a preferred combination of transmission techniques (an adaptation mode) is provided for a number of ranges of signal to noise ratio estimates (received from the channel estimation processor 404). It is a change in a received estimate to a value outside the range of the current adaptation mode that triggers a change in adaptation mode to be decided upon by the adaptive processor 402.

Adaptive modulation and coding techniques are already used in the telecommunications industry with the changes being triggered by measurements made at the opposite end or based on channel traffic performance. The changes in the modulation and coding are typically communicated by the transmitter to the receiver through signaling channels and messages that are otherwise part of the radio communication system. In these systems, a message containing instructions for the modulation and coding to be used in the future is sent over the radio communications signaling channel to the receiver. This message usually indicates that at some specified or implicit time in the future, the modulation and coding will change to the new format. This technique introduces some delay in the format change due to the time needed for transmission and reception of the message. As another example, in the Digital Video Broadcast Standard, mentioned previously, a subset of the sub-carriers are allocated, much like the pilot sub-carriers, for use to signal the modulation and coding for the current transmission. These sub-carriers are referred to as the Transmission Parameter Sub-carriers (TPS). This technique is preferable as it minimizes the delay for changes in format as the transmission parameter signals are contained with each symbol.

It has been earlier stated that the adaptable transmission techniques include modulation, coding, power level, beam tracking and space-time coding. The manner in which these transmission techniques may be adapted to the channel conditions is discussed in the following.

Taking into account a worst-case channel, a typical radio communication system may be arranged to use Quadrature Phase Shift Keying (QPSK) for modulating data on the transmitted carrier. However, where the modulation technique is adaptable to the measured channel conditions, the modulation technique may range from Binary Phase Shift Keying (BPSK), for a poor channel, through QPSK and 16-Quadrature Amplitude Modulation (16-QAM) to 64-QAM for a high quality channel.

The data sent over the radio system 100 is typically coded to protect against errors in the received signal. As part of the coding process, extra transmitted bits are sent which enable the detection and correction of errors by the receiver. There are a number of forms of coding some more suited to transmissions in which a lot of errors are expected and some for which few errors are expected. In a non-adaptive system, the coding technique is selected to suit one aspect of the channel conditions and the error performance of the communications varies depending on the actual channel conditions which may vary from very few induced errors to very many. In an adaptive system, such as that which is proposed herein, measurements are made of the channel performance or the error rate and, if the performance is unsatisfactory, another coding technique selected that is better matched to the channel conditions. In this technique, typically, the errors are held below the desired rate while the delivered data rate varies according to the channel conditions. Whenever the channel conditions are better than average, an adaptive system can achieve a higher data throughput than one which does not adapt to the channel conditions. The adaptation, however, is at the expense of more complexity in the transmitter and receiver and the need for additional signaling between the two to coordinate the changes in coding technique.

Through an analysis of two received sub-carriers, it may be seen that the part of the channel occupied by these sub-carriers is subject to fading. It may then be determined that the power level of the transmission sub-carrier, which lies at a frequency between the two received sub-carriers, should be increased.

In a simple radio system, a single antenna is used that provides coverage of a region. The region may include many desired users in addition to sources of interference or noise. The level of this interference is typically responsible for limiting the performance of the radio communications either in terms of capacity (i.e., the number of users than can be supported at once) or data rate (i.e., the maximum bit rate that can be delivered to a user). In these cases the desired signals and the interference must be separated by a process performed by the radio receiving apparatus. This process is equally applicable to communications from the base station to the mobile unit (downlink) and from the mobile to the base station (uplink). In beam tracking systems, an antenna array is used that enables the radio signals to be concentrated or focused in small regions of the coverage region. The antenna array may, for example, be directed to concentrate the gain (i.e., direct a beam) on the signals of one mobile unit while also reducing the interference from other sources (i.e., direct a null). These beam directing (tracking) operations may be directed either by simple direction (i.e., by sending the beam in a predetermined direction) or through a feedback technique in which, for example, the strength of the desired signal is measured and the beam direction controls adjusted to maximize the strength of the desired signal. These beam tracking systems have the advantage that they reduce the level of interference seen by the receiver and thus enable either more users to be accommodated within a given cell or better service (i.e., higher bit rates) for each user. However, this advantage is achieved at the expense of a more complex antenna structure containing multiple elements and the means to measure the performance and adjust beam steering controls to track the beam. Further discussion of antenna beam tracking techniques may be found in J. S. Thompson, P. M. Grant and B. Mulgrew, "Smart Antenna Arrays for CDMA Systems", in the journal IEEE Personal Communications, October 1996, pp. 16-25.

Space-time coding is a technique that achieves higher throughput for a radio communications system through the use of antenna arrays at both the transmitter and receiver. A radio communications system that utilizes a single antenna at each end of a radio link is limited to a single communications channel and this limits the capacity throughput. If there are multiple antennas at each end of the link, there is, in effect, an almost separate communications path between each antenna pair. As there are multiple paths available, the capacity of the system is increased in proportion to the number of antennas used. Space-time coding is a technique for creating multiple transmission signals to be sent from each of the multiple antennas to exploit the multiple transmission paths. Further details of the space-time coding techniques may be found in A. J. Paulraj and C. B. Papadias, "Space-Time Processing for Wireless Communications", in the IEEE Signal Processing Magazine, November 1997, pp. 49-83.

The mobile transceiver apparatus 500 for the mobile terminal 106 is shown in FIG. 5. Again, for clarity in explanation, FIG. 5 shows separation between the transmit antenna 514 and the receive antenna 518. The signal processing flow is similar to that occurring in the base station transceiver apparatus 400 of the base station 102 (FIG. 4), except that the user data transmissions occur on the even sub-carriers and the data reception occurs on the odd sub-carriers (for the present example). Note also that, if polarization is used to assist separation of the transmit sub-carriers and the receive sub-carriers, the transmit antenna 514 and the receive antenna 518 will have polarization matching the base station format (i.e., the mobile receive antenna 518 will match the polarization of the base station transmit antenna 414, and the mobile transmit antenna 514 will match the polarization of the base station receive antenna 418).

Two additional processes involving symbol timing and frequency control are introduced for the mobile station.

The mobile terminal 106 determines the values of the frequencies of the sub-carriers of the base station transmitter 405 and adjusts the frequencies of the transmitted sub-carriers so that the transmitted sub-carriers of the mobile terminal 106 properly interleave with the sub-carriers received from the base station 102. In this case, the mobile terminal 106 is a slave, for frequency control, to the base station 102. This is usually the case for a mobile communications system, as there are many more mobile terminals 106 than base stations 102.

At the mobile terminal 106, output from the FFT 526 is sent to the symbol timing and frequency controller 532 that may adjust the center frequency of transmission sub-carriers to interleave with the sub-carriers center frequencies of the signal received from the base station 102. If the mobile terminal 106 is moving rapidly, then the frequencies of the sub-carriers transmitted by the base station transmitter 405 will be offset by a Doppler shift. This offset (or frequency error) will be a few Hertz, depending on the speed of the mobile terminal 106 in relation to the base station 102. This frequency error cannot easily be compensated. However, the spacing of the odd sub-carriers may be made sufficient to accommodate such a small error without undue loss of orthogonality.

The mobile terminal 106 must also adjust the symbol timing of its transmissions to match the symbol timing of the transmissions sent by the base station 102. This is necessary so that the transmission time used for each symbol by the mobile terminal 106 coincides with the transmission time used for each symbol by the base station 102. This assists in maintaining orthogonality through the IFFT/FFT processing. There will be some error in the symbol timing due to the propagation time of the signals over the air. However, this error will typically be small and may be allowed for as part of a guard interval incorporated in the symbol transmissions. Alternatively, the base station transceiver apparatus 400 may estimate the symbol timing offset of the signals received from the mobile terminal 106 and signal this timing error to the mobile terminal 106, using signaling mechanisms inherent in the radio communication system 100. The mobile terminal 106 may then adjust its symbol timing to compensate for the transmission timing delays as is common in such communications systems.

To assist in the symbol timing and frequency control, the base station 102 may include in its transmissions a set of pilot sub-carriers. The symbol timing and frequency controller 532 may detect a frequency shift by searching for the locations of the pilot sub-carriers and adjust the frequencies of the locally transmitted sub-carriers to correct the offset. The pilot sub-carriers may also be used to detect the symbol timing and used to correct the timing of the mobile station 106. Chapter four of the book by Richard van Nee and Ramjee Prasad, "OFDM for Wireless Multimedia Communications" Artech House Publishers 2000, ISBN 0-89006-530-6 contains the details of synchronization used in OFDM transceivers.

Figure 6:
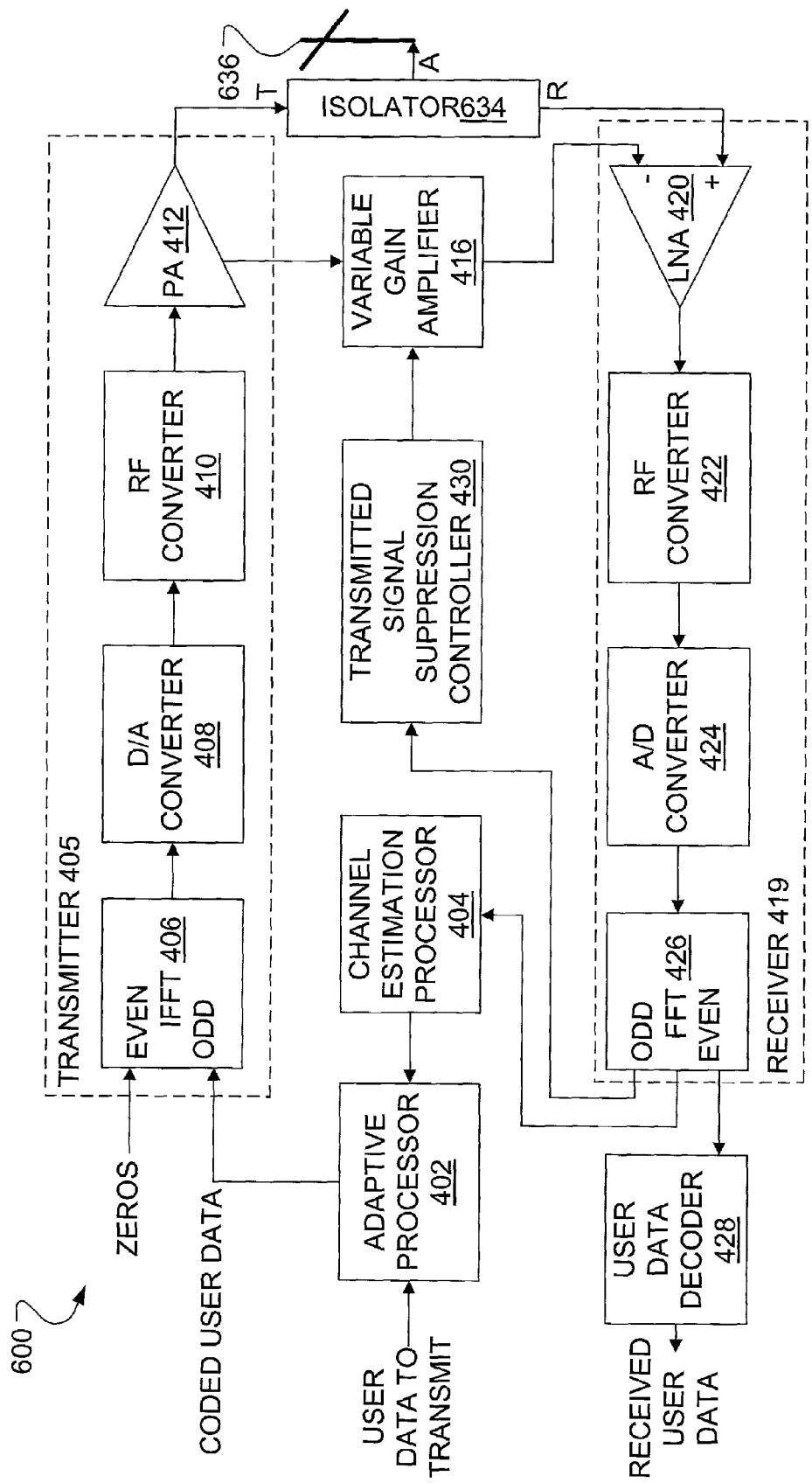
FIG. 6 schematically illustrates, in an alternative to the transceiver of FIG. 4, a transceiver apparatus for a base station of FIG. 1 according to an embodiment of the present invention.
Figure 7:
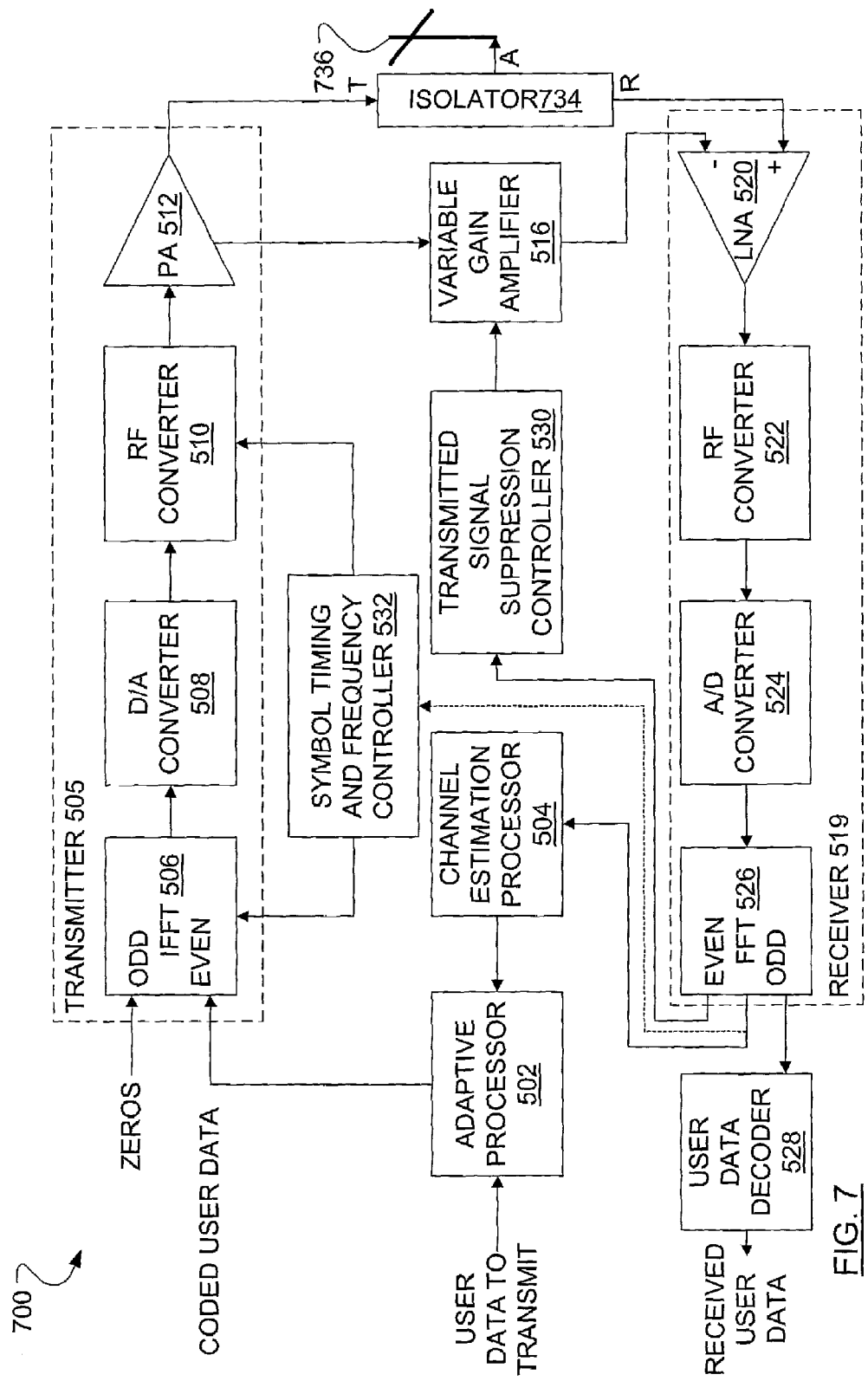
FIG. 7 schematically illustrates, in an alternative to the transceiver of FIG. 5, a transceiver apparatus for a mobile terminal of FIG. 1 according to an embodiment of the present invention.

Earlier it was noted that the preferred arrangement for the transceiver apparatus 400, 500 includes a combined transmit and receive antenna. This is necessary to assure, at high radio frequencies (e.g., 1-5 GHz) typically used for mobile communications systems, that the transmission and reception radio propagation paths are the same. If the paths are the same, then the measurements made at the receiver can be used to adapt the transmissions effectively. The earlier illustrations (FIG. 4 and FIG. 5) showed separate transmit antenna 414, 514 and receive antenna 418, 518. FIG. 6 and FIG. 7 show a single-antenna base station transceiver apparatus 600 and a single-antenna mobile terminal transceiver apparatus 700, respectively.

The signal processing and flow at the single-antenna base station transceiver apparatus 600 are the same as previously described in conjunction with the base station transceiver apparatus 400. A single antenna 636, however, is coupled to the power amplifier 412 and to the summation input of the LNA 420 by means of an isolator 634. Devices, such as the isolator 634, are commonly used in radio equipment and allow coupling of a single antenna to the base station transmitter 405 and the base station receiver 419 without undue coupling between the base station transmitter 405 and the base station receiver 419. In the illustrations, the isolator 634 provides a low loss path from a T (for transmit) terminal to an A (for antenna) terminal and a high loss path (isolation) from the T terminal to an R (for receive) terminal. This isolates the base station transmitter 405 from the base station receiver 419 to some degree, but typically not perfectly (i.e., typically 20 dB isolation). Similarly the isolator 634 provides a low loss connection from the A terminal to the R terminal and a high loss connection from the A terminal to the T terminal. Of course, some of the energy that passed from the T terminal to the A terminal, will be radiated by the antenna 636, reflected from objects nearby back to the antenna 636 and hence be coupled from the A terminal to the R terminal and into the base station receiver 419. The isolator 634 must therefore be augmented by the differential LNA 420 in front end of the base station receiver 419 to remove the transmitted signal from the received signal. As the reflected signals will be delayed in time in reaching the base station receiver 419, the variable gain amplifier 416 must provide suitable amplitude and phase adjustment to the error signal to enable the transmitted signal to be cancelled correctly. The variable gain amplifier 416 may also contain an equalizer function, as described earlier herein, to compensate for the multiple reflections of the transmitted signal.

Similarly, the signal processing and flow at the single-antenna mobile transceiver apparatus 700 are the same as previously described in conjunction with the mobile transceiver apparatus 500. Like the single-antenna base station transceiver apparatus 600, the single-antenna mobile transceiver apparatus 700 includes an isolator 734 for coupling a single antenna 736 to the power amplifier 512 and to the summation input of the LNA 520.

As will be apparent to a person skilled in the art, although this technique of communication using simultaneous orthogonal signals is especially well adapted to the wireless radio communication environment, the channel over which signals are transmitted and received may well be a telephone line, a coaxial cable connection or any other communication channel.

In particular, the communication channel may be a digital subscriber line (DSL). Communication over a DSL channel does require channel estimation, but as the cables are fixed, the DSL channel does not have the dynamic problems that are faced in the wireless domain. Typically the DSL channel can be equalized once and then the compensation remains effective for a long time (hours or days). In the wireless domain the channel changes within milliseconds so the channel must be measured and compensation adjusted frequently.

Other modifications will be apparent to those skilled in the art and, therefore, the invention is defined in the claims.

We claim:

1. A method of communicating over a communications channel comprising:

receiving, at a device, a received signal that includes a remotely transmitted signal, where said remotely transmitted signal is in a given frequency band; and transmitting, at said device, concurrent with said receiving, a locally transmitted signal in said given frequency band, where said locally transmitted signal is substantially orthogonal to said remotely transmitted signal, wherein said remotely transmitted signal has a first set of sub-carrier center frequencies characterized by a presence of signal, and a first set of zero signal frequencies characterized by an absence of signal and said transmitting comprises transmitting said locally transmitted signal having a second set of sub-carrier center frequencies and a second set of zero signal frequencies, where said second set of sub-carrier center frequencies correspond in frequency to said first set of zero signal frequencies and said second set of zero signal frequencies correspond in frequency to said first set of sub-carrier center frequencies.

2. The method of claim 1 wherein said locally transmitted signal has a predefined symbol duration and said sub-carrier center frequencies in said second set of sub-carrier center frequencies have a frequency spacing equal to the reciprocal of said symbol duration.

3. The method of claim 1 wherein said second set of sub-carrier center frequencies is interleaved in frequency with said first set of sub-carrier center frequencies.

4. The method of claim 3 further comprising assigning an integer index to each sub-carrier center frequency in said given frequency band, wherein said first set of sub-carrier center frequencies have odd indices and said second set of sub-carrier center frequencies have even indices.

5. The method of claim 3 further comprising:
determining an amount of downlink traffic in said locally transmitted signal;
determining an amount of uplink traffic said remotely transmitted signal; and
determining a traffic ratio, where said traffic ratio is a ratio of said amount of downlink traffic to said amount of uplink traffic;
wherein a ratio of a number of center frequencies in said first set of sub-carrier center frequencies to a number of center frequencies in said second set of sub-carrier center frequencies is proportional to said traffic ratio.

6. The method of claim 3 further comprising, for a given symbol, selecting said second set of sub-carrier center frequencies from a transmitter pseudo-random set of candidate center frequencies, where said transmitter pseudo-random set of candidate center frequencies is non-overlapping with a receiver pseudo-random set of candidate center frequencies.

7. The method of claim 6 further comprising switching said pseudo-random sets of candidate center frequencies to new sets such that, for a subsequent symbol, selecting said second set of sub-carrier center frequencies front new transmitter pseudo-random set of candidate center frequencies, where said new transmitter pseudo-random set of candidate center frequencies is non-overlapping with a new receiver pseudo-random set of candidate center frequencies.

8. The method of claim 7 wherein said switching to said new sets follows a pseudo-random pattern known to a transmitter of said locally transmitted signal.

9. The method of claim 1 further comprising:
obtaining a Fourier transform of said received signal;
determining, from said Fourier transform of said received signal, frequency values of said first set of zero signal frequencies; and
adjusting said second set of sub-carrier center frequencies to correspond in frequency to said first set of zero signal frequencies.

10. The method of claim 1 further comprising:
determining a symbol timing offset from said remotely transmitted signal; and
adjusting a timing of symbols in said locally transmitted signal based on said determining.

11. The method of claim 1 further comprising:
generating an error signal from said locally transmitted signal; and
subtracting said error signal from said received signal to suppress elements of said locally transmitted signal in said received signal.

12. The method of claim 11 wherein said generating comprises attenuating said error signal.

13. The method of claim 11 wherein said generating comprises developing a composite of multiple attenuated and phase shifted copies of said locally transmitted signal.

14. The method of claim 1 wherein said remotely transmitted signal is encoded using a first code and said transmitting further comprises encoding said locally transmitted signal using a second code, where said second code is substantially orthogonal to said first code.

15. The method of claim 14 wherein said first code and said second code are orthogonal spreading codes.

16. The method of claim 15 wherein said orthogonal spreading codes are based on Walsh functions.

17. The method of claim 1 wherein said communications channel is a wireless communications channel.

18. The method of claim 17 further comprising:
estimating characteristics of said communications channel in said given frequency band based on said received signal; and
adjusting said transmitting based on said estimated characteristics.

19. The method of claim 18 further comprising obtaining a Fourier transform of said received signal, where said estimated characteristics are based on said Fourier transform of said received signal.

20. The method of claim 19 further comprising recognizing a pilot signal in said Fourier transform of said received signal, where said pilot signal is remotely transmitted at a predetermined frequency and modulated in a predetermined pattern.

21. The method of claim 18 wherein said adjusting said transmitting comprises adjusting a transmission power level.

22. The method of claim 18 wherein said adjusting said transmitting comprises adjusting a modulation technique.

23. The method of claim 18 wherein said adjusting said transmitting comprises adjusting a coding technique.

24. The method of claim 18 wherein said adjusting said transmitting comprises adjusting an antenna beam tracking technique.

25. The method of claim 18 wherein said adjusting said transmitting comprises adjusting a space-time coding technique.

26. A method of communicating over a communications channel comprising:
receiving, at a device, a received signal that includes a remotely transmitted signal, where said remotely transmitted signal is in a given frequency band; and
transmitting, at said device, concurrent with said receiving, a locally transmitted signal in said given frequency band, where said locally transmitted signal is substantially orthogonal to said remotely transmitted signal, the method further comprising:
generating an error signal from said locally transmitted signal; and
subtracting said error signal from said received signal to suppress elements of said locally transmitted signal in said received signal, the method further comprising:

detecting an amount of said locally transmitted signal in said received signal; and based on said detecting, adjusting said generating to further suppress said elements of said locally transmitted signal.

27. The method of claim 26 where said detecting comprises:

obtaining a Fourier transform of said received signal; and determining, from said Fourier transform of said received signal, power levels at said second set of sub-carrier frequencies.

28. The method of claim 27 wherein said adjusting said generating is based on said power levels.

29. An apparatus for communicating over a communications channel comprising:

a receiver operable to receive a received signal that includes a remotely transmitted signal, where said remotely transmitted signal is in a given frequency band; and a transmitter operable to transmit, concurrent with receiving, a locally transmitted signal in said given frequency band, where said locally transmitted signal is substantially orthogonal to said remotely transmitted signal;

wherein said remotely transmitted signal has a first set of sub-carrier center frequencies, characterized by a presence of signal, and a first set of zero signal frequencies, characterized by an absence of signal and said transmitting said locally transmitting signal having a second set of sub-carrier center frequencies and a second set of zero signal frequencies, where said second set of sub-carrier center frequencies correspond in frequency to said first set of zero signal frequencies and said second set of zero signal frequencies correspond in frequency to said first set of sub-carrier center frequencies.

30. An apparatus for communicating over a communications channel comprising:

means for receiving a received signal that includes a remotely transmitted signal, where said remotely transmitted signal is in a given frequency band; and means for transmitting, concurrent with said receiving, a locally transmitted signal in said given frequency band, where said transmitted signal is substantially orthogonal to said remotely transmitted signal, wherein said remotely transmitted signal has a first set of sub-carrier center frequencies, characterized by a presence of signal, and a first set of zero signal frequencies, characterized by an absence of signal and said transmitting comprises transmitting said locally transmitted signal having a second set of sub-carrier center frequencies and a second set of zero signal frequencies, where said second set of sub-carrier center frequencies correspond in frequency to said first set of zero signal frequencies and said second set of zero signal frequencies correspond in frequency to said first set of sub-carrier center frequencies.

31. A radio communication system comprising:

a base station including:

a base station receiver operable to receive a base station received signal that includes a mobile terminal transmitted signal, where said mobile terminal transmitted signal is in a given frequency band; and a base station transmitter operable to transmit, concurrent with said receiving, a base station transmitted signal in said given frequency band, where said base station transmitted signal is substantially orthogonal to said mobile terminal transmitted signal;

a mobile terminal including:

a mobile terminal receiver operable to receive a mobile terminal received signal that includes said base station transmitted signal; and a mobile terminal transmitter operable to transmit, concurrent with said receiving, said mobile terminal transmitted signals, wherein said mobile terminal transmitted signal has a first set of sub-carrier center frequencies, characterized by a presence of signal, and a first set of zero signal frequencies, characterized by an absence of signal and said base station transmitted signal has a second set of sub-carrier center frequencies and a second set of zero signal frequencies, where said second set of sub-carrier center frequencies correspond in frequencies to said first set of zero signal frequencies and said second set of zero signal frequencies correspond in frequency to said first set of sub-carrier center frequencies.

32. The radio communication system of claim 31 wherein said given frequency band is divided into a plurality of sub-carrier center frequencies, said base station is allocated a first sub-set of said plurality of sub-carrier center frequencies on which to transmit and said mobile terminal is allocated a second sub-set of said plurality of sub-carrier center frequencies on which to transmit, where said first sub-set and second sub-set are mutually exclusive.

33. The radio communication system of claim 32 further comprising:

a controller unit operable to:

measure a traffic flow from said mobile terminal to said base station and from said base station to said mobile terminal;

re-allocate said plurality of sub-carrier center frequencies to a new first sub-set and a new second sub-set based on said measuring; and communicate identities of said sub-carrier center frequencies advocated to said new first sub-set and said new second sub-set to said base station and said mobile terminal.

* * * * *

UNITED STATES PATENT AND TRADEMARK OFFICE
CERTIFICATE OF CORRECTION

PATENT NO. : 7,304,939 B2 Page 1 of 1
APPLICATION NO. : 09/998193
DATED : December 4, 2007
INVENTOR(S) : David G. Steer et al.

It is certified that error appears in the above-identified patent and that said Letters Patent is hereby corrected as shown below:

Column 17, claim 5, line 29 - "traffic said" should read --traffic in said--
Column 17, claim 7, line 49 - "front" should read --from a--
Column 20, claim 31, line 28 - "frequencies" should read --frequency--
Column 20, claim 33, line 51 - "advocated" should read --allocated--

Signed and Sealed this

Twenty-eighth Day of October, 2008

JON W. DUDAS
*Director of the United States Patent and Trademark Office*